(12) United States Patent
Kortschack et al.

(10) Patent No.: US 9,692,323 B2
(45) Date of Patent: Jun. 27, 2017

(54) METHOD FOR ACTUATING A MULTI-ACTUATOR DRIVE DEVICE

(75) Inventors: Axel Kortschack, Oldenburg (DE);
Christoph Raβ, Oldenburg (DE)

(73) Assignee: SMARACT HOLDING GMBH, Oldenburg (DE)

( * ) Notice: Subject to any disclaimer, the term of this patent is extended or adjusted under 35 U.S.C. 154(b) by 569 days.

(21) Appl. No.: 14/007,935

(22) PCT Filed: Mar. 1, 2012

(86) PCT No.: PCT/EP2012/053529
§ 371 (c)(1),
(2), (4) Date: Jan. 30, 2014

(87) PCT Pub. No.: WO2012/130555
PCT Pub. Date: Oct. 4, 2012

(65) Prior Publication Data
US 2014/0132112 A1 May 15, 2014

(30) Foreign Application Priority Data

Mar. 30, 2011 (DE) .......... 10 2011 015 559
Mar. 1, 2012 (DE) .......... 10 2012 101 688

(51) Int. Cl.
*H02N 2/00* (2006.01)
*H02N 2/06* (2006.01)
(Continued)

(52) U.S. Cl.
CPC ............. *H02N 2/0075* (2013.01); *H02N 2/06* (2013.01); *H02N 2/025* (2013.01); *H02N 2/101* (2013.01)

(58) Field of Classification Search
CPC .............................. H01L 41/042; H02N 2/025
(Continued)

(56) References Cited

U.S. PATENT DOCUMENTS 6,140,750 A  10/2000 Ueyama
6,194,811 B1  2/2001 Shinke et al.
(Continued)

FOREIGN PATENT DOCUMENTS

DE        42 37 509 A1   5/1994
DE   10 2006 048 238 A1   5/2007
(Continued)

OTHER PUBLICATIONS

Breguet, "Actionneurs "Stick and Slip" Pour Micro-Manipulateurs," Thése No. 1756, École Polytechnique Fédérale de Lausanne, 1998, 164 pages.
(Continued)

*Primary Examiner* — Shawki S Ismail
*Assistant Examiner* — Bryan Gordon
(74) *Attorney, Agent, or Firm* — Seed IP Law Group LLP

(57) ABSTRACT

A method is disclosed for controlling a linear or rotary multi-actuator drive device having a stationary and a movable part. Relative movement between the stationary and the movable parts is generated via actuators having limited strokes, which are in substantially continuous frictional contact with the movable part either directly or via a force-transmitting mechanism, wherein control signals having a timing offset are used therefor, which force alternation between the slip phase and the stick phase for each actuator. Speed variations and vibrations of the device are reduced or prevented by utilizing the elasticity in the drive components, by building up, between the points of friction of the actuators by means of control waveforms adapted to the respective situation for the various actuators, suitable mechanical tensions which prevent undesired variation in the force exerted by the actuators on the movable part, above all when an actuator transitions from the stick phase to the slip phase, or when one or more actuators reverse direction.

17 Claims, 9 Drawing Sheets

(51) Int. Cl.
*H02N 2/02* (2006.01)
*H02N 2/10* (2006.01)

(58) Field of Classification Search
USPC .................................. 310/317, 323.02, 328
See application file for complete search history.

(56) References Cited

U.S. PATENT DOCUMENTS

| | | | |
|---|---|---|---|
| 6,218,764 | B1 | 4/2001 | Yoshida et al. |
| 7,301,257 | B2* | 11/2007 | Hwang .................. H02N 2/025 310/317 |
| 7,355,325 | B2* | 4/2008 | Johansson ............ H02N 2/0055 310/323.01 |
| 2003/0085633 | A1 | 5/2003 | Marth |
| 2005/0275315 | A1 | 12/2005 | Manabe et al. |
| 2006/0049716 | A1* | 3/2006 | Yuasa .................... H02N 2/067 310/317 |
| 2007/0043451 | A1* | 2/2007 | Geyer .................. G05B 19/351 700/42 |
| 2008/0191583 | A1* | 8/2008 | Bohn ...................... H02N 2/025 310/329 |
| 2010/0013354 | A1* | 1/2010 | Marth .................... H02N 2/062 310/317 |
| 2010/0142064 | A1* | 6/2010 | Ashizawa .............. H02N 2/163 359/824 |
| 2010/0314970 | A1 | 12/2010 | Culpi et al. |
| 2011/0304241 | A1 | 12/2011 | Voigtlaender et al. |
| 2011/0317287 | A1 | 12/2011 | Aoki et al. |
| 2011/0317292 | A1* | 12/2011 | Kuwano .................. G02B 7/08 359/824 |
| 2014/0152147 | A1 | 6/2014 | Rass et al. |

FOREIGN PATENT DOCUMENTS

| | | |
|---|---|---|
| DE | 10 2009 013 849 A1 | 9/2010 |
| EP | 0 750 356 A1 | 12/1996 |
| EP | 0 823 738 A2 | 2/1998 |
| EP | 2 006 995 A1 | 12/2008 |
| WO | 93/19494 A1 | 9/1993 |
| WO | 2007/144251 A1 | 12/2007 |
| WO | 2010/088937 A1 | 8/2010 |
| WO | 2010/098138 A1 | 9/2010 |
| WO | 2010/113505 A1 | 10/2010 |
| WO | 2012/123251 A1 | 9/2012 |
| WO | 2012/130555 A1 | 10/2012 |

OTHER PUBLICATIONS

Breguet et al., "Stick and Slip Actuators: design, control, performances and applications," *International Symposium on Micromechatronics and Human Science*, pp. 89-95, 1998.

German Search Report, dated Oct. 15, 2012, for German Application No. 10 2012 004 294.9, 7 pages.

German Search Report, dated Oct. 18, 2012, for German Application No. 10 2012 004 401.1, 6 pages.

International Search Report and Written Opinion, mailed Mar. 31, 2014, for International Application No. PCT/EP2013/054258, 9 pages.

International Search Report and Written Opinion, mailed Jun. 10, 2013, for International Application No. PCT/EP2013/054264, 9 pages.

Pohl, "Dynamic piezoelectric translation devices," *Rev. Sci. Instrum.* 58(1):54-57, 1987.

* cited by examiner

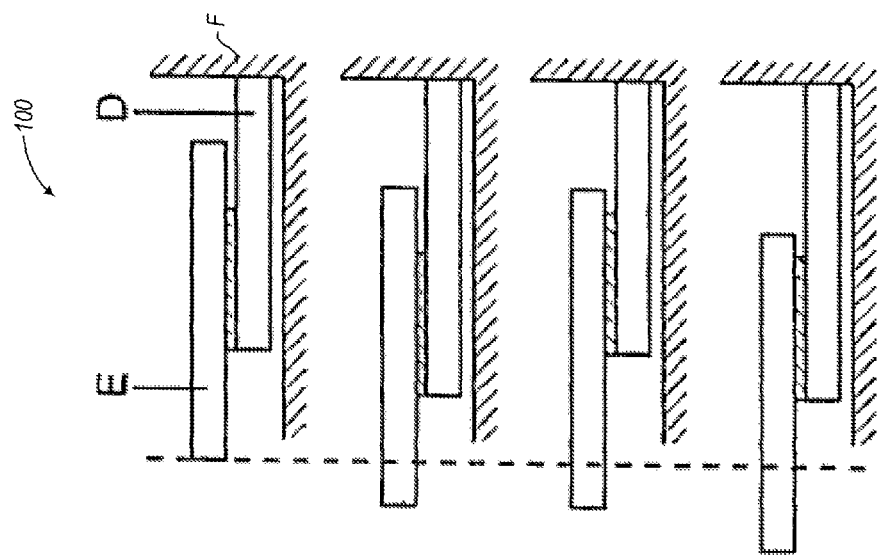
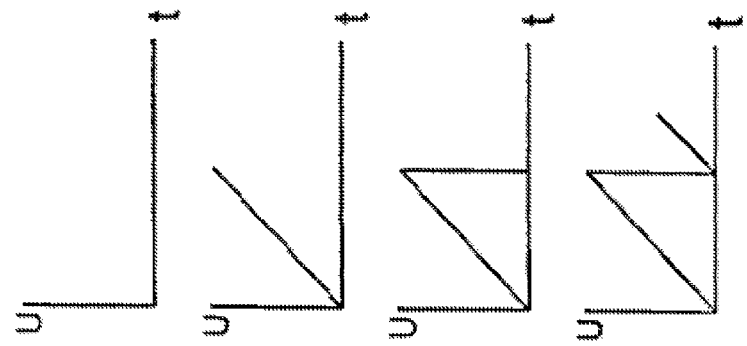
Fig. 1A
Fig. 1B (Prior Art)

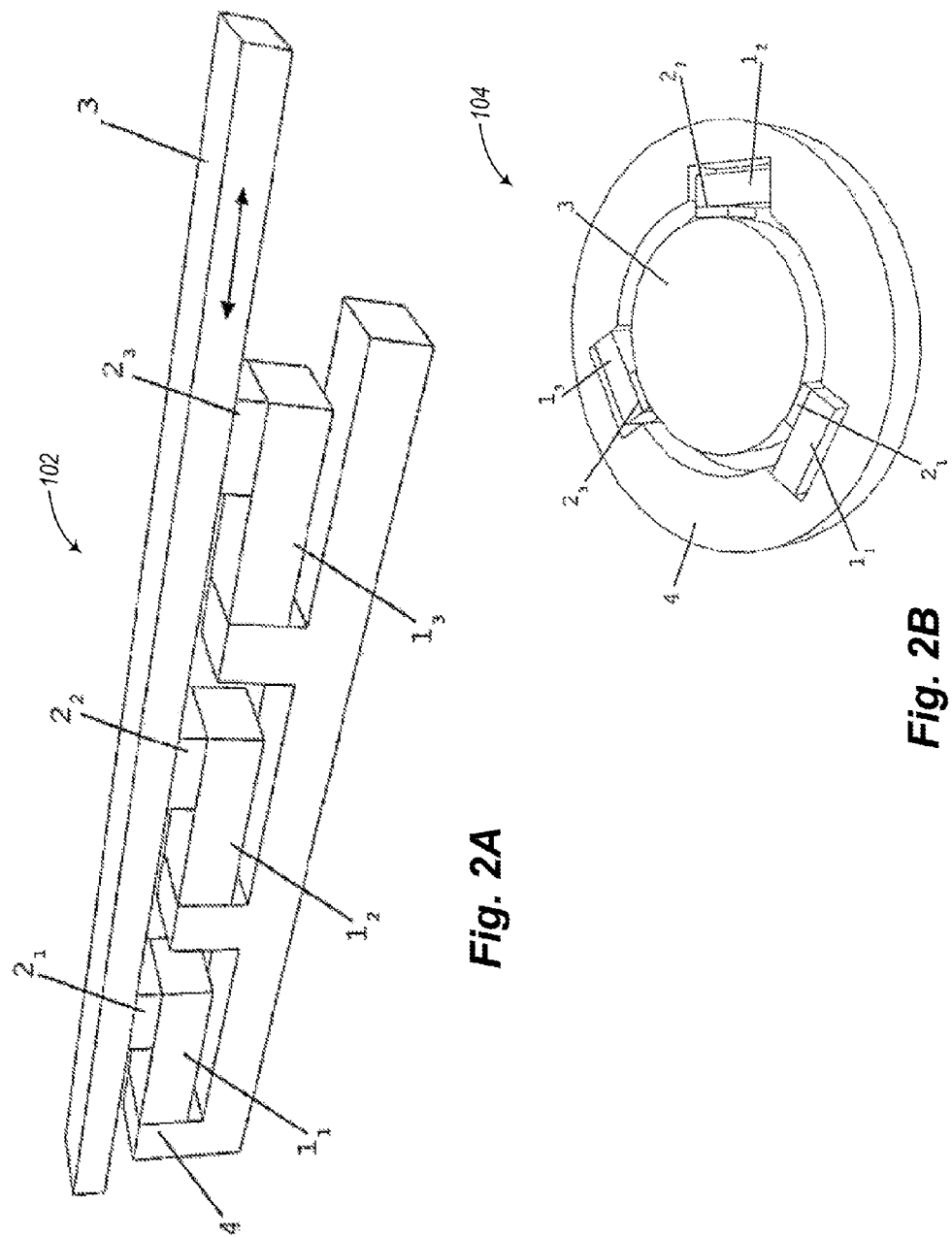

METHOD FOR ACTUATING A MULTI-ACTUATOR DRIVE DEVICE

RELATED APPLICATION

This patent application claims benefit under 35 U.S.C. §119(e) of International Patent Application No. WO 2012/130555A1, filed on Mar. 1, 2012, German Patent Application No. 10 2011 015 558.7, filed Mar. 30, 2011 and German Patent Application No. 10 2012 101 688.7, filed Mar. 1, 2012, which are hereby incorporated by reference in their entireties.

BACKGROUND

Technical Field

A method is disclosed for controlling a linear or rotary multi-actuator drive device having a stationary part and a movable part, wherein relative movement between the stationary and the movable parts is generated via actuators having limited strokes, which are in continuous frictional contact with the movable part either directly or via a force-transmitting mechanism.

Description of the Related Art

Several drive technologies that allow large adjustment paths, despite the actuators having short strokes, are known from the prior art. These technologies can be subdivided into various different variants. Different types of actuators having limited strokes can be used. Piezoelectric and electrostrictive actuators are particularly suitable. Both linear and rotary movements can be generated by means of such drive devices.

The precursors of multi-actuator drives are inertia drives, specifically in this case the stick-slip drives known from D. W. Pohl, "Dynamic piezoelectric translation devices", in Review of Scientific Instruments, Vol. 58 (1), January 1987, pages 54-57. In such drives, a piezoelectric actuator is provided to which a periodic, sawtooth-like signal is applied, and which produces an acceleration relative to a displaceably mounted runner, frictionally connected to the actuator. When the acceleration of the piezoelectric actuator is low, the runner follows the actuator due to frictional engagement. When the acceleration of the piezoelectric actuator is high, in contrast, the runner slips relative to the actuator as soon as the inertial force of the runner is greater than the frictional force between the runner and the actuator. When several steps are performed, it is also possible for macroscopic movements to be realized. Inertia drives are a mechanically simple way of positioning objects over large distances and with high movement resolution. However, a disadvantage of inertia drives is that braking, standstill or even backwards motion of the movable components can occur again and again during the slip phase. This behavior couples-in vibrations, which are disruptive for precision positioning tasks.

The principle of an inertia drive 100, in which an actuator D is fixed to one side of an immobile mass F can be seen from the drawings in FIGS. 1A and 1B. Body E is in frictional contact with actuator D. When actuator D is slightly accelerated by applying a slowly changing voltage as shown in FIG. 1B, body E is moved with it. When actuator D accelerates strongly, the inertial force of body E is greater than the static friction, thus generating relative movement between body E and actuator D. Early multi-actuator drives were similar to such an inertia drive and differ initially in that two or more actuators are used.

FIG. 2A shows a basic structure of a prior art linear multi-actuator drive 102, and FIG. 2B shows the basic structure of a rotary multi-actuator drive 104 known from the prior art. Such multi-actuator drives comprise at least two actuators $1_1, 1_2, 1_n$, which can be driven individually or in groups by a respective control signal to perform a limited stroke. If piezoactuators are used, the stroke typically ranges up to a number of microns. The actuators each have a point of friction 2 which is in frictional contact with a runner 3. The actuators are also fixedly connected to a base 4. The points of friction need not necessarily consist of one plate only, as shown in the Figures, but may also be mechanically complex constructions that perform several different functions. For example, it is possible that this component is used to mechanically tension the actuator as well, as is common in the case of piezoceramics, for example.

The structure of multi-actuator drives can also be inverted, of course, with the runner 3 being the stationary component and the base 4 being the movable component. The drive principle is still the same in either case.

FIG. 3 shows a set of normal time-voltage waveforms 106 for controlling a plurality of actuators, which are controlled with a timing offset 108 by means of sawtooth voltages 110, similarly to a classic inertia drive, and the typical resultant movement 112 for the runner 3.

For specific realizations, reference is made to the publication by Jean Marc Berguet entitled, "Actionneurs 'Stick and Slip' pour Micro-Manipulators," (EPFL, 1998), which describes, for multi-actuator drives, based on the teaching in EP 0750356 A1, with two, three, and four actuators per drive, that the variations in speed and the vibrations typical for inertia drives are less in a multi-actuator drive. An interesting aspect of the solution is that the multi-actuator drive utilizes the inertial forces of the movable component, due to the strong acceleration of the piezoactuators, so that low-vibration movement in comparison with simple inertia drives can already be achieved with just two actuators. The technique disclosed in EP 0750356 A1 is also described in US 2010/0314970 A1 and US 2008/0191583 A1.

In such drives also, due to their principle of operation, the runner may make an undesired backwards movement 114 or stop or be braked when an actuator transitions to the slip phase. FIG. 3 visualizes the case of slight backwards movement.

A special form of multi-actuator drive is described in WO 93/19494, where the individual friction surfaces are progressively made to slip as a result of rapid deformation of the piezoceramics. The friction surfaces are subsequently deflected together in one direction by applying an identical voltage ramp. When this synchronous deflection occurs, the runner does not slip relative to the friction surfaces, but is entrained instead. However, it is disadvantageous that the runner is exposed to strong vibrations due to the constant changes in acceleration.

According to DE 10 2009 013 849 A1, a drive based on piezo tubes and having a plurality of friction surfaces is controlled with a timing offset in order to effect a movement. The control signals are chosen so that a plurality of actuators drive a runner, in order to progressively retract the actuators such that the runner is held in a position by the plurality of unmoved friction surfaces during refraction, i.e., it stands still. In this drive, phases of motion and standstill repeatedly occur for the runner, with the result that vibrations continue to occur and smooth motion is not possible.

"Inchworm drives" are another class of multi-actuator drives. These are drives in which a runner to be moved is alternately clutched by actuators, the distance between the two sets of clutching actuators being varied by a further actuator. A runner can also be moved over large distances by controlling the actuators in an appropriate cyclical manner. This class of actuators generally causes disruptive vibrations, in that high-frequency movements acting orthogonally to the direction of motion are coupled-in by the clutching operations.

In prior art multi-actuator drives, undesired vibrations and deviations of the actual position of the runner from a target position occur. This effect is particularly great when one or more frictional contacts transition from the stick phase to the slip phase.

BRIEF SUMMARY

FIGS. 4-9 show various new embodiments as disclosed herein. Embodiments described herein provide an improved method for controlling a multi-actuator drive device, which solves the problem of disruptive vibrations, entails only slight undesired variations in speed and which allows a strong force to be achieved.

Such an improved method is set forth in claim 1; the dependent claims specify variants and developments of the method that are at least appropriate.

The method disclosed proceeds from a drive device of the kind initially specified, which comprises a plurality of actuators that each have the typical phases of static friction and sliding friction.

The direction of movement of the drive is predefined by the choice of direction in which the majority of the various actuators move during the stick phase during most of the cycle time.

Smooth running is achieved by taking into consideration and utilizing the elastic properties of the actuators and the other mechanical elements of the drive, as well as the effect of elasticity, when controlling the actuators.

The above makes it possible to implement controlling strategies that are combinable with each other and which result in drives that run very smoothly.

In one embodiment, a mechanical tension can be built up between the friction surfaces by systematically moving the actuators in static friction towards each other with a local relative movement, without the associated friction surfaces slipping. Such relative motion is principally generated by controlling the actuators with individual control signals. Such mechanical tension exerts a force along the direction in which the actuators and/or the friction surfaces move. Such a force affects the position of the runner.

Mechanical tension can stretch or compress the actuators and mechanical parts involved. For example, when two actuators act against each other, one of the actuators is compressed in relation to the free state, whereas the second actuator is stretched.

If, for example, only one of the tensioned actuators is stretched by a control system, a second, non-driven actuator is likewise stretched, since the friction surfaces of the two actuators are coupled via the runner as long as neither of the friction surfaces slips. Since both actuators and the mechanical parts have a certain stiffness, the actuator being driven and associated mechanical parts are not deflected quite as far as would be the case in the free state, whereas the second, non-driven actuator and associated mechanical parts are stretched, which would also not be case in the free state. The movable component of the drive is thus moved by that distance, without slipping of the friction surfaces.

It is possible in this way for local movements to be imparted to the movable component of the drive, also called the runner. The mechanical tensions between the friction surfaces can be utilized in many ways.

For example, local deviations from a desired movement can be compensated, and the tensions can be maintained until they can act against disruptive influences.

If the direction of motion of one or more actuators of the multi-actuator drive changes, this will produce a change in the forces being exerted, which in turn will affect the position of the runner. However, if mechanical tensions counteracting this change in forces have been built up between the friction surfaces, the effect of this change in forces will be less. An undesired change in forces leads to errors in the positioning or speed of the runner. Since the undesired changes in forces acting on the runner are reduced or even entirely cancelled out by the inventive control method, the errors in positioning or speed are concomitantly reduced or even eliminated entirely.

A further example will illustrate this. If an actuator or group of actuators transitions from the stick phase to the slip phase, part of the mechanical tension between this or these actuators and the other actuators still in the stick phase will usually be relaxed, resulting primarily in undesired forces exerted on the runner, which leads in turn to errors in the positioning or speed of the runner. The mechanical tension that can be adjusted by the control signals is used to reduce or desirably to compensate for undesired movement of the runner when an actuator or group of actuators transitions from the stick phase to the slip phase. This results in smooth, low-vibration motion that is usually quiet as well.

This influence is particularly great when the transition to the slip phase is not slow, but in the form of a sudden acceleration of the friction surface transitioning to the slip phase, as is common in inertia drives, for example.

The individually adjustable waveforms can also be used to compensate undesired forms of movement on the part of the individual actuators, which can lead to undesired mechanical tensions.

The approach described above, which surprisingly leads in practical experiments to substantially smoother running, can be pursued with several different control strategies.

BRIEF DESCRIPTION OF THE SEVERAL VIEWS OF THE DRAWINGS

The method shall now be described in greater detail with reference to an embodiment and with the aid of Figures, in which FIG. 1A is a series of end view snapshots of a actuator D and a body E in frictional contact with one another, illustrating the principle of an inertial drive, according to the prior art.

FIG. 1B is a series of graphs of a sawtooth-like control signal as a function of time, corresponding to the snapshots shown in FIG. 1A.

FIG. 2A is a perspective view of a linear multi-actuator drive, according to the prior art.

FIG. 2B is a perspective view of a rotary multi-actuator drive, according to the prior art.

DETAILED DESCRIPTION

Examples of some control strategies shall now be described with embodiments and with reference to FIGS. 4-9.

If only two actuators are used, then strong accelerations are necessary in order to transition from the stick phase to the slip phase of the respective actuator.

If more than two actuators are used, then strong accelerations are no longer imperative. In some variants of the control strategy, it may even be necessary to avoid strong accelerations.

One particular control variant allows the runner to be deliberately moved forwards or backwards, without further mechanical tension building up between the friction surfaces, by adding a compensatory movement to all the control signals of the actuators equally. This can be utilized to compensate for remaining vibrations, variations in speed or errors in positioning.

If the aim, in contrast, is to build up further mechanical tension, then one option that suggests itself is to apply such a movement solely to subgroups of the actuators of the drive.

If an actuator or group of actuators reverses direction or transitions to the slip phase, this normally results in variation in the force acting on the runner, thus bringing it away from the ideal or desired speed or position. This problem can be solved in the manner described by building up mechanical tensions between the friction surfaces, by controlling the individual actuators. If an actuator or group of actuators transitions from the stick phase to the slip phase, part of the mechanical tension between this or these actuators and the other actuators still in the stick phase is relaxed. This causes a force to be exerted on the runner, which counteracts the undesired force due to the transition from the stick to the slip phase, with the result that the runner keeps its desired speed or position significantly better. This leads to smooth motion with little vibration and with minimal deviation from a target position.

Such compensation may be achieved by sudden movement of individual or all actuators in the stick phase.

Figure 3:
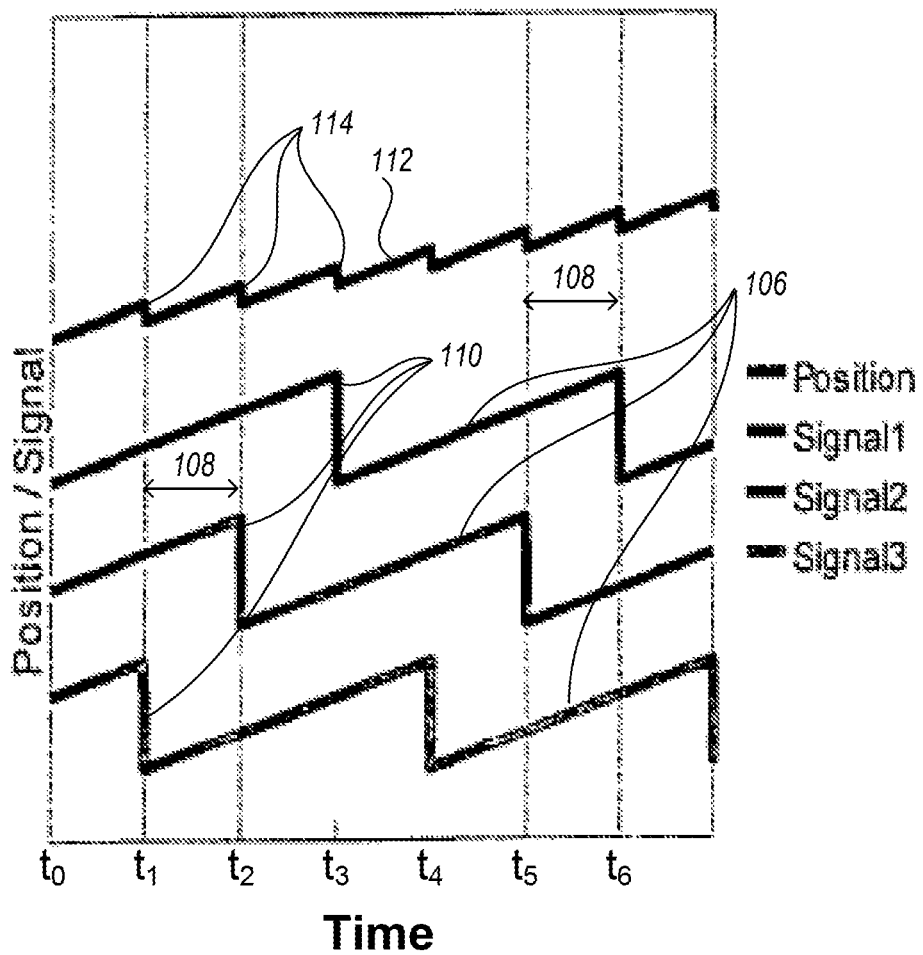
FIG. 3 is a plot of position as a function of time for a moveable component, or runner, of a prior art multi-actuator drive, in response to a series of three time-offset sawtooth voltage waveforms.
Figure 4:
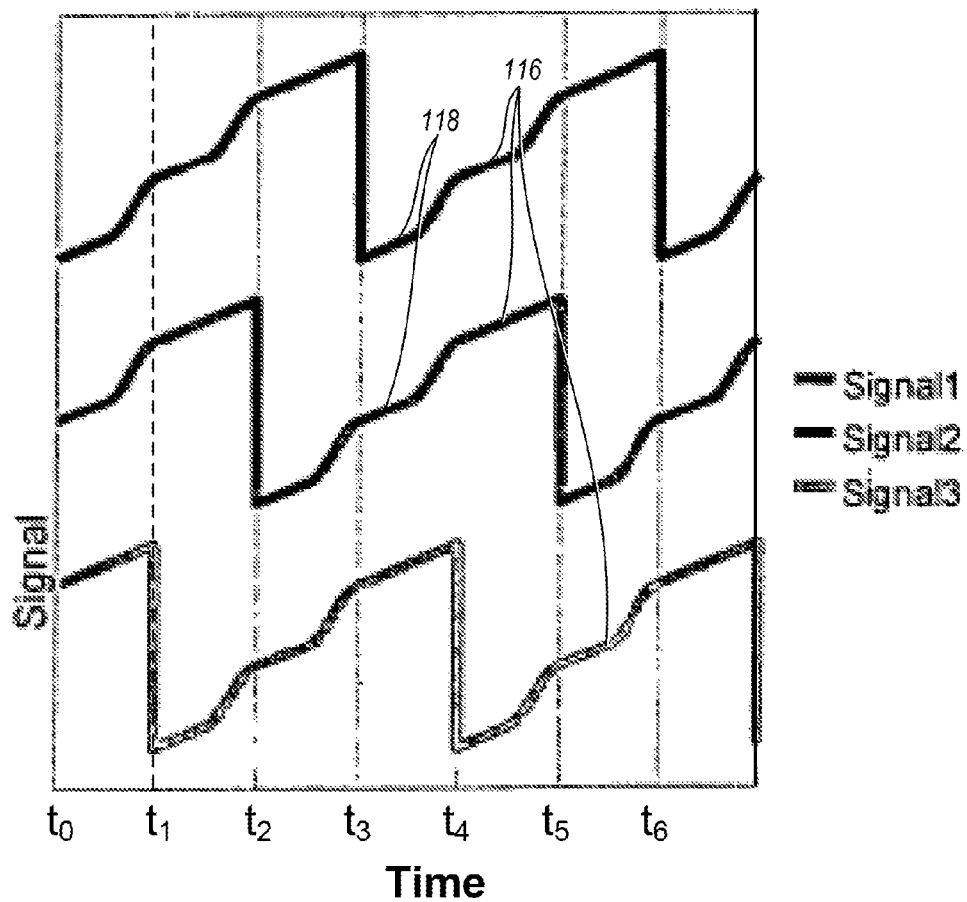
FIGS. 4-9 are signal plots of a series of three time-offset sawtooth voltage waveforms used as multi-actuator control signals in various embodiments described herein.

Instead of sudden movements, the disruptive effect of this transition can be compensated advantageously with slower and different speeds before an actuator transitions to the slip phase. FIG. 4 shows, by way of example, such greatly simplified control signals 116.

If, for example, the actuator transitioning to the slip phase holds back a little, the other actuators can be driven forwards a little more speedily by the control method in or before this phase, such that the force is compensated and the speed of the runner remains constant.

The advantage of somewhat slower change 118 is that the compensatory movement can be performed in a more controlled manner than is the case with sudden or jerky compensation. The overall result is smoother, low-vibration motion.

An appropriate compensatory movement can basically be performed at any time, for example on a permanent basis, or more probably before a transition from the stick phase to the slip phase, or also after a transition, since the mechanical tension that is built up cannot be maintained indefinitely. The same applies, of course, to a reversal of direction by one or more actuators.

In order to obtain sufficient degrees of freedom for setting suitable mechanical tensions as actuators are involved in the drive, it makes sense to apply separate control signals to the individual actuators, which impart different speeds or even accelerations to the actuators.

This allows a required mechanical tension to have built up between the friction surfaces of the actuators, when an actuator or group of actuators reverses direction or transitions to the slip phase, for example, in order in this way to compensate the disruptive forces acting on the runner. Due to the transition of the actuator to the slip phase, for example, part of the mechanical tension is relaxed, such that it then exerts such a force on the runner that counteracts the force resulting from acceleration of the friction surface and ideally compensates the latter entirely.

The same also applies to a reversal of direction by one or more of the actuators, because, as already described, such a change of direction can also lead to undesired changes in the forces being exerted and thus to errors in positioning and speed.

Figure 5:
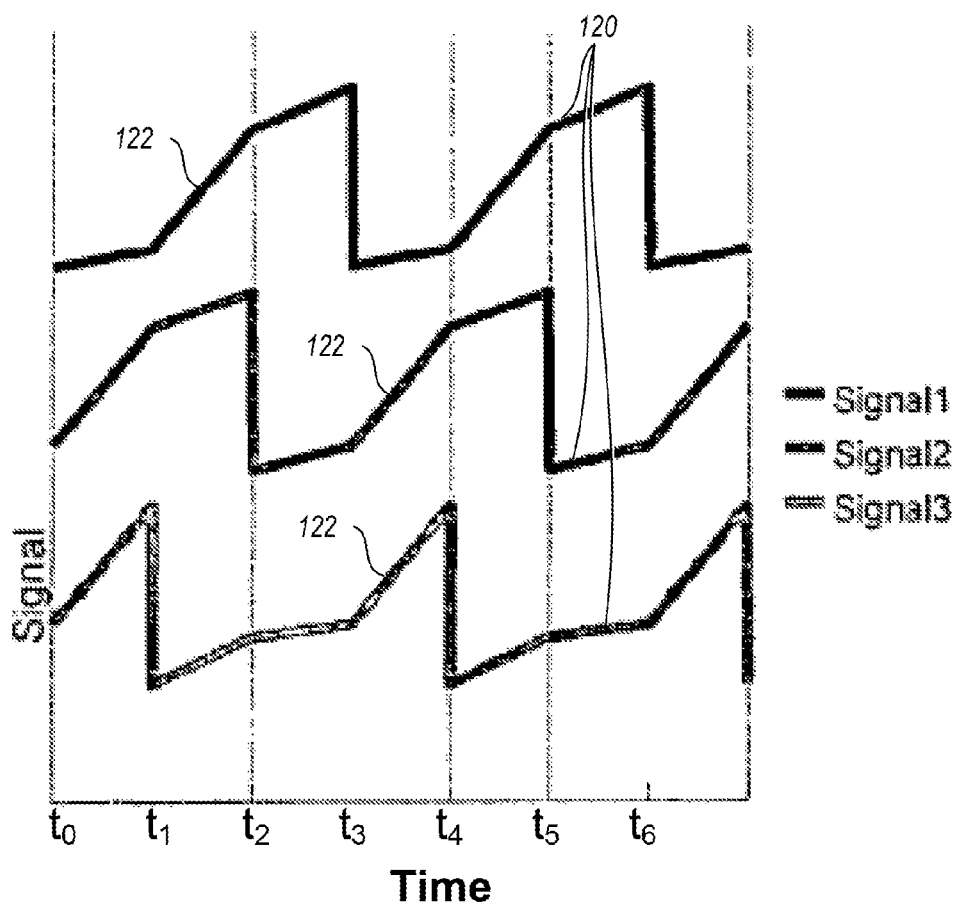

It is advantageous that any actuator can change its speed or acceleration at any time. It is possible, but not imperative, for all the actuators of a drive to be involved in these compensatory movements. By way of example, FIG. 5 shows such signals 120 for controlling the drive in the case of three actuators. In this example, the control signals cause strong accelerations 122 to be applied in one direction, as is normal for inertia drives, so that relatively strong accelerations act on the respective runner that it is necessary to compensate. This strong acceleration can be dispensed with, of course, which has the advantage that strong vibrations then occur to a lesser extent. The control method described herein can be used in both cases.

Figure 6:
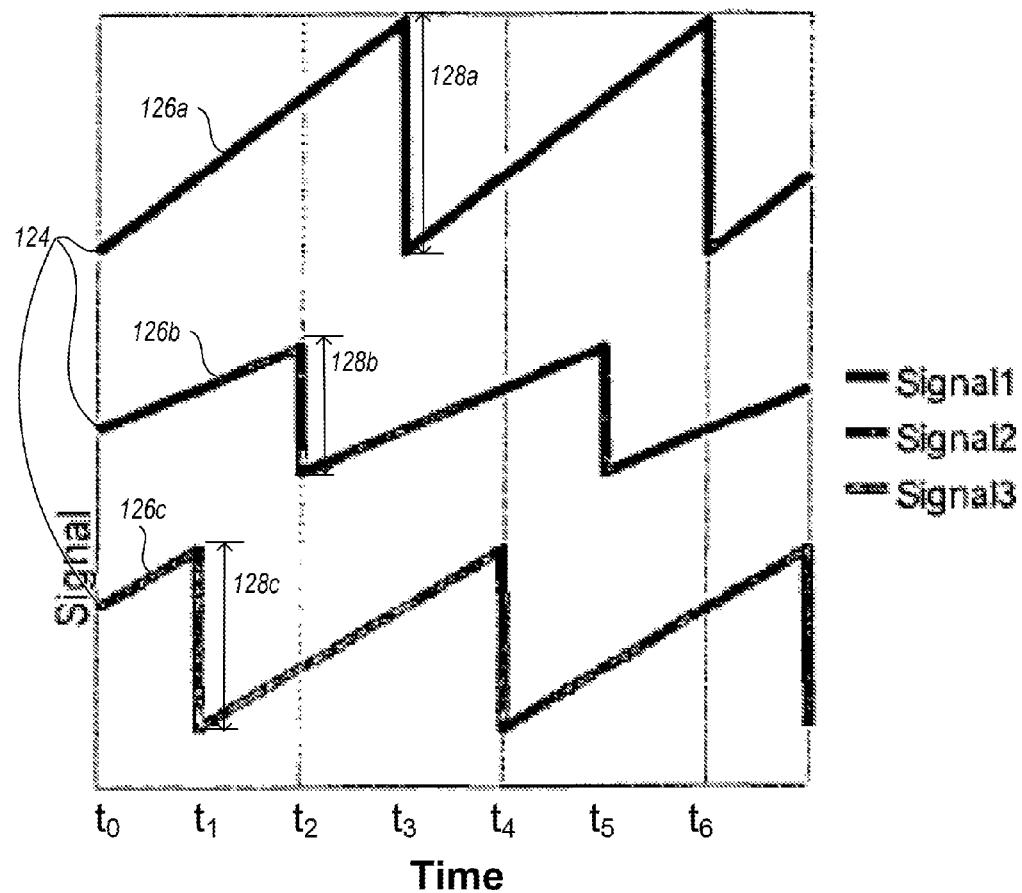

In another variant, it is possible to impart individual speeds to the different actuators in the stick phase. This also means that mechanical tensions among the different actuators can be built up or reduced in a targeted manner. Here, too, it is possible but not imperative that all the actuators of a drive be involved in these compensatory movements. FIG. 6 shows examples of control signals 124 for a multi-actuator drive having different speeds 126a, 126b, and 126c or control amplitudes 128a, 128b, and 128c per actuator. For the sake of simplicity, a variant is shown in FIG. 6 in which strong accelerations of the kind that is common in inertia drives are applied. It is also possible to dispense with these strong accelerations.

Figure 7:
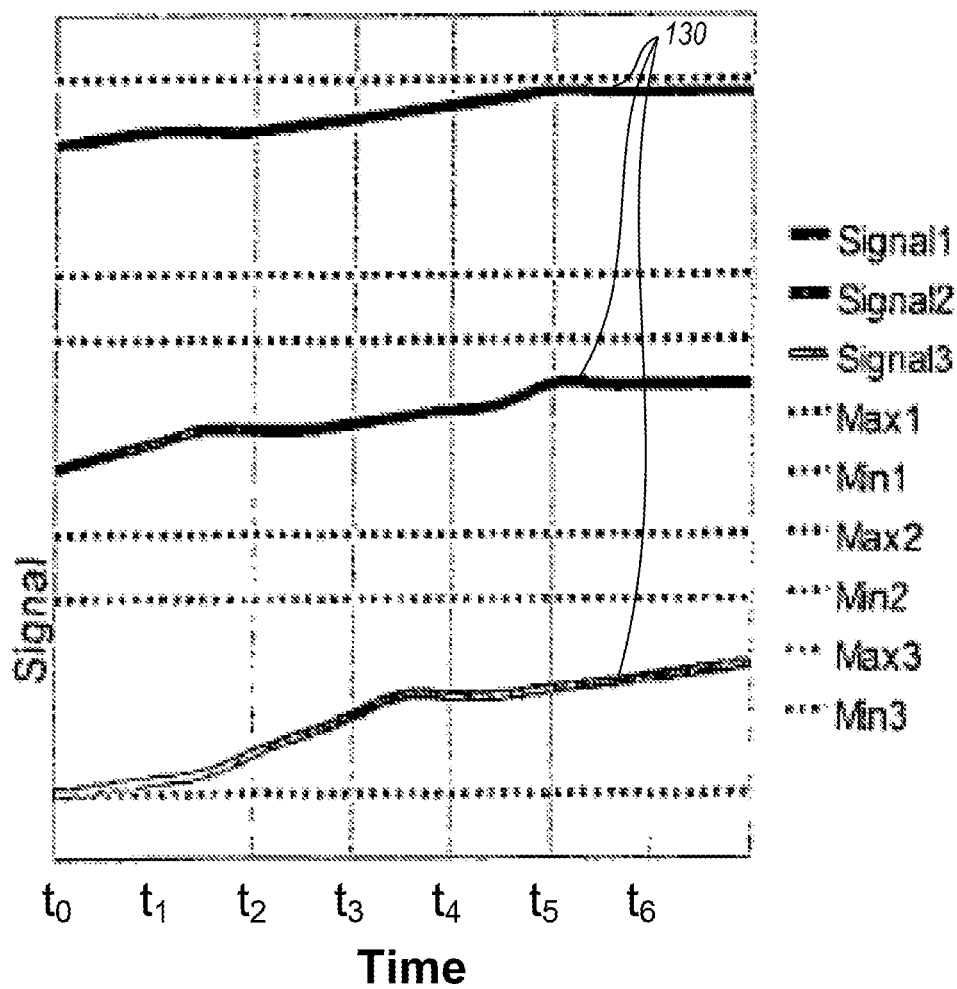

As FIG. 7 shows, the signals applied to the actuator and the concomitant movements that are imparted to the actuators do not have to be linear.

FIG. 7 shows a segment in which the waveforms 130 are non-linear, so that smaller deviations from a desired movement, which as already described can lead to local movements of the runner, are compensated in this phase also.

In order to set suitable mechanical tensions to compensate the exertion of forces, it may make sense to take into consideration the different behaviors of the actuators being used.

It is possible in this way to compensate various parasitic factors affecting smooth running of the runner. Such parasitic factors include differing behavior of the actuators, for example, different saturations, different stroke lengths or characteristic curves, drift in the actuators, different installation conditions and different actuators.

Figure 8:
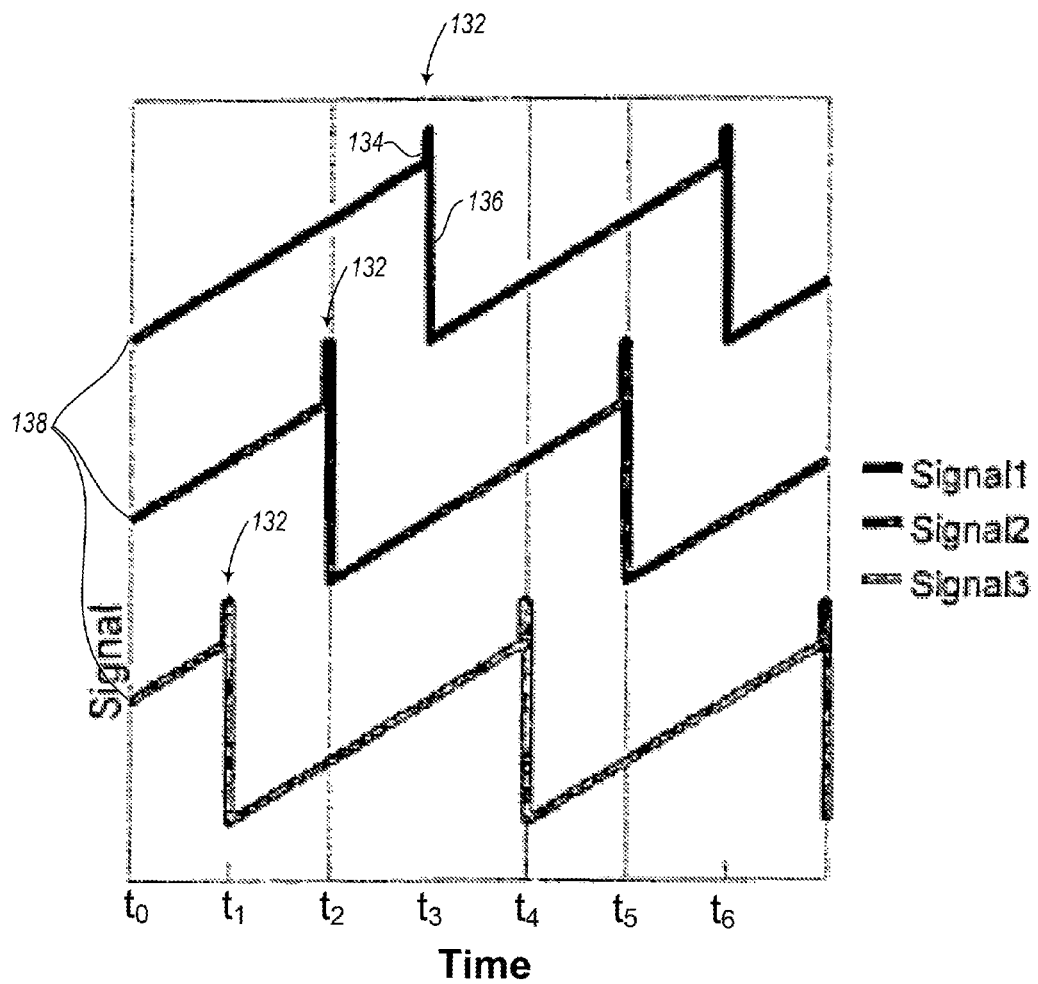

A special case for building up a suitable mechanical tension is when the respective actuator is moved immediately before a transition 132 from the stick phase 134 to the slip phase 136 with a different speed and in close temporal proximity relative to the other friction surfaces. The height and duration of the control signals can preferably be separately adjusted for each individual actuator. Examples of different waveforms 138 in this regard are shown in FIG. 8.

This can be done not only for individual actuators, but also for groups of actuators that are moved in synchrony.

Powerful micro- and nanopositioning systems generally operate with position monitoring, using interferometers or high-resolution optical encoders, for example. The measurement data thus obtained can be used to detect vibrations and variations in speed, and to develop individual waveforms with which the actuators can be controlled in such a way that smooth motion can be achieved.

This can be done using a form of calibration, for example, in which ideal waveforms for the various actuators are calculated that can then be applied to the actuators with a suitable frequency and shape in order to move the runner. Ideally, the waveforms obtained by such calibration can then be applied cyclically to the actuators and result in low-vibration movement.

Another possibility is to use a control loop that allows the waveforms to be continuously adapted so that it is possible to respond to changing boundary conditions, such as temperature variations, external forces, ageing of the actuators and other conditions, with the ultimate aim of achieving smooth and strong movement.

In another control loop, a compensatory movement can be applied that locally counteracts a positioning error and is desirably added equally to each one of the actuators.

In yet another control loop, the cycle duration for the periodic signals can be used as a control parameter.

It is particularly advantageous when these three parameters, namely the waveforms, the added movement and the cycle time, are used in combination with each other.

Another approach for building up suitable mechanical tensions between the friction members, so as to prevent undesired movement of the runner when an actuator transitions from the stick phase to the slip phase, is to perform steps with the actuators in a cyclical manner with intervals. At each individual step, a mechanical tension builds up between the friction surface of the actuator performing the step and the friction surfaces of the idle actuators. As soon as a nearest actuator performs a step, the mechanical tension that has been built up helps this actuator to transition more easily, and with less force, from the stick phase to the slip phase, so that less force is exerted on the runner due to the transition from the stick phase to the slip phase. Less variation in speed then results, and in the ideal case there is no variation in speed.

It is particularly advantageous when the steps performed by the individual actuators produce minimal vibrations. Such a situation exists when the pulse duration of the individual pulses of the control signal is less than the cycle duration of the natural oscillation of the positioner.

This principle can be applied regardless of whether only two or more actuators are used per drive and regardless of whether steps are performed by individual actuators or by groups of actuators.

Figure 9:
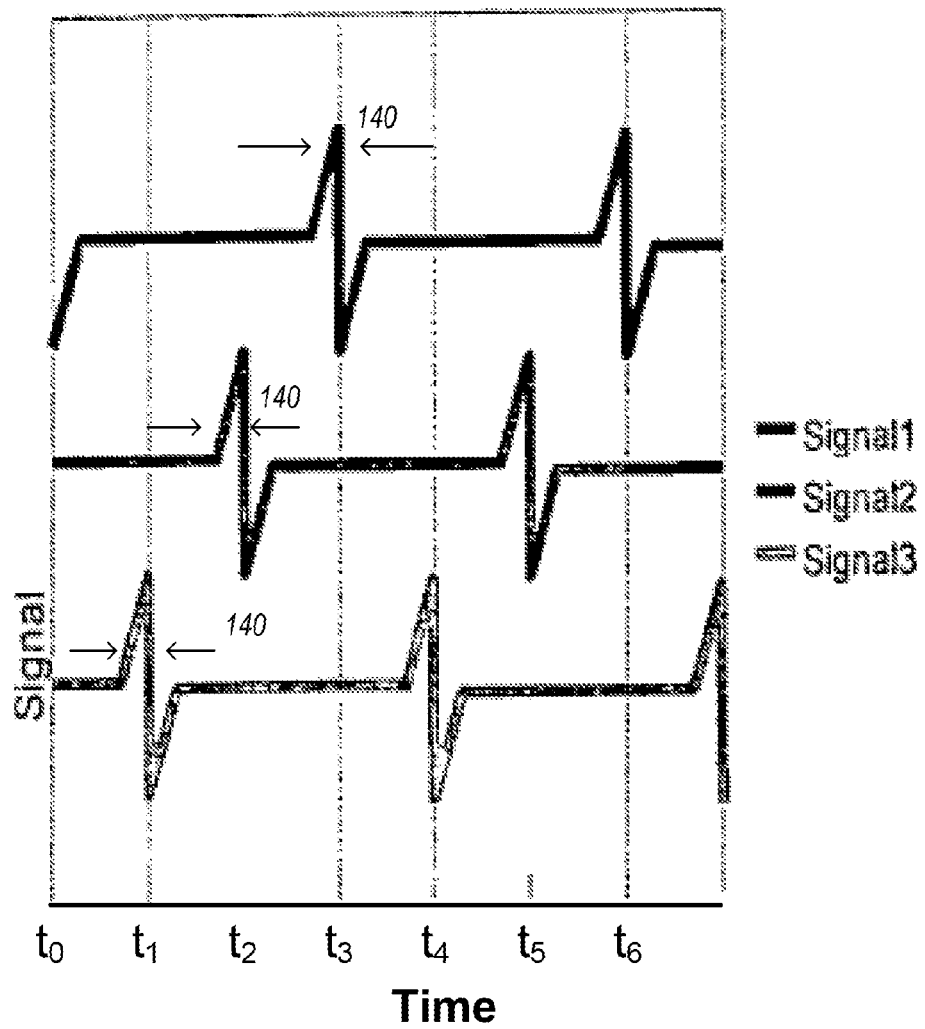

In order to obtain an appropriate drive performance, the step amplitudes, the step duration and indeed the step symmetry of the individual actuators may be individually adjustable. The combination of individually adjustable waveforms for multi-actuator drives, using the very short step duration 140 as described above, allows drives with very little vibration and very short periods of transient oscillations after each step. FIG. 9 shows examples of typical control signals in this regard.

It is possible to combine the inventive approaches described herein.

In addition to the cyclical operation described hitherto, it is also possible to move the runner of the multi-actuator drive with the movement resolution of the actuators by controlling the individual actuators with semi-static signals in the order of magnitude of the stroke lengths of the individual actuators. In the case of piezoceramics, for example, this allows movement resolutions to be achieved that extend significantly into the sub-nanometer range.

In other words, it is not necessary for the scanning movement to be part of the stepped movement. Instead, the scanning movement may also be performed autonomously of the stepped movement, e.g., when the movement must be performed locally and with high resolution.

In one embodiment, all or parts of the control strategies mentioned above, by way of example, may be combined to move the drive as smoothly as possible and with minimal vibration.

The invention claimed is:

1. A method for controlling a multi-actuator device, the method comprising:
    applying a first signal to a first actuator of the multi-actuator device to drive a runner, the first signal having a waveform that is non-linear during a stick phase of the waveform and is a step during a slip phase of the waveform;
    applying a second signal to a second actuator of the multi-actuator device to drive the runner, the second signal having a waveform that is non-linear during a stick phase of the waveform and is a step during a slip phase of the waveform;
    applying a third signal to a third actuator of the multi-actuator device to drive the runner, the third signal having a waveform that is non-linear during a stick phase of the waveform and is a step during a slip phase of the waveform;
    modifying the waveform of the second and third signals when the first signal is transitioning into a slip phase of the waveform, the modification being to drive the second and third actuators more speedily to assist to compensate for a force variation that will occur when the first actuator enters the slip phase; and
    modifying the waveform of the second and third signals again when the first signal is transitioning away from the slip phase of the waveform to the stick phase of the waveform, the modification being to reduce drive speed of the second and third actuators from the speed they were being driven at when the first actuator was transitioning into the slip phase.

2. The method according to claim 1, further comprising, due to the applied control signals, forcing actuator movements which build up mechanical tensions between the points of friction, said tensions reducing and substantially equalizing deviations of movable components from a desired movement within a cycle.

3. The method according to claim 1, further comprising:
    systematically feeding the actuators with adaptive control waveforms that,
    inducing the actuators to perform movements preventing mechanical tension between the points of friction of the actuators, which arises when different actuators being used behave differently.

4. The method according to claim 1 further comprising:
    selectively controlling the position of the movable part via adaptive control waveforms, which build up appropriate mechanical tensions between the points of friction of the actuator, or via a cycle duration, or via combinations thereof.

5. The method according to claim 1, further comprising:
compensating a remaining deviation of a resultant movement of the movable part from a movement within a control cycle by adding a compensatory movement equally to each one of the actuators, to prevent further mechanical tension from building up between the points of friction.

6. The method according to claim 4, further comprising:
realizing cyclically short steps having intervals, using individual actuators by means of the adaptive control waveforms,
wherein a step is performed when one or more of the actuators is stationary, and
wherein, at each step, mechanical tensions build up between the points of friction, which counteract an exertion of force on the movable part when an actuator or a group of actuators transitions from the stick phase to the slip phase.

7. The method according to claim 6 wherein the adaptive control waveforms operate with control step pulses, having a duration, for individual actuators, below a natural oscillation period of a drive, such that small steps can be performed in accordance with each actuator, with very low vibration.

8. The method according to claim 1 wherein the controlling speed variations of the device occurs in response to an actuator or group of actuators transitioning from the stick phase to the slip phase.

9. The method according to claim 1 wherein the controlling speed variations of the device occurs in response to one or all actuators reversing direction.

10. The method for controlling a multi-actuator device of claim 1 further comprising:
obtaining measurement data of the runner including detecting at least one of a vibration and a speed variation of the runner;
developing individual waveforms for each actuator of the plurality of actuators in response to at least one of the vibration and the speed variation of the runner; and
counteracting at least one the vibration and the speed variation of the runner by controlling each actuator of the plurality of actuators with the individual waveforms.

11. The method for controlling a multi-actuator device of claim 10 wherein the developing individual waveforms includes utilizing a control loop, the control loop allowing for adaption of the individual waveforms in response to changing boundary conditions.

12. The method for controlling a multi-actuator device of claim 11 wherein the utilizing the control loop includes applying a compensatory movement to correct a positioning error from a first control loop, or applying a variation to a cycle duration from a second control loop, or a combination thereof.

13. The method according to claim 1 in which the step of building mechanical tension in the multi-actuator device by increasing a forward force of at least one of the plurality of actuators concurrently with at least one of the plurality of actuators entering a slip phase is carried out in different actuators of the plurality.

14. The method according to claim 1 in which the step of building mechanical tension in the multi-actuator device by increasing a forward force of at least one of the plurality of actuators concurrently with at least one of the plurality of actuators entering a slip phase is carried out in the same actuator of the plurality, with the same actuator that is transitioning to enter the slip phase carrying out the step of building mechanical tension in the multi-actuator device by increasing its forward force as part of the transition as it enters the slip phase.

15. The method for controlling a multi-actuator device of claim 1 wherein the variation in speed applied to the second and third actuators results in a smoother, low vibration movement of the runner.

16. The method for controlling a multi-actuator device of claim 1 further including:
modifying the waveform of the second actuator at a different rate than the modification of the waveform of the third actuator when the first waveform is transitioning into a slip phase of the waveform.

17. The method for controlling a multi-actuator device of claim 16 further including:
driving the second actuator at a faster rate than the third actuator when the first waveform is transitioning into a slip phase of the waveform.

* * * * *